United States Patent
Kumazawa et al.

[11] Patent Number: 5,846,899
[45] Date of Patent: Dec. 8, 1998

[54] CERAMIC HONEYCOMB CATALYST HAVING EXCELLENT THERMAL SHOCK RESISTANCE

[75] Inventors: Kazuhiko Kumazawa, Nagoya; Koichi Ikeshima, Okazaki, both of Japan

[73] Assignee: NGK Insulators, Ltd., Japan

[21] Appl. No.: 821,345

[22] Filed: Mar. 20, 1997

[30] Foreign Application Priority Data

Mar. 29, 1996 [JP] Japan .................................. 8-076617

[51] Int. Cl.⁶ ............................. B01J 33/00; B01J 21/04; C03C 10/08; B32B 3/12
[52] U.S. Cl. ............................. 502/439; 502/527; 502/1; 428/116; 428/117; 428/118; 501/9
[58] Field of Search ..................... 502/439, 527, 502/1; 428/116, 117, 118; 501/9

[56] References Cited

U.S. PATENT DOCUMENTS

| | | | |
|---|---|---|---|
| 4,435,512 | 3/1984 | Ito et al. | 501/9 |
| 4,451,516 | 5/1984 | Kato | 501/9 |
| 4,451,517 | 5/1984 | Inoguchi et al. | 428/116 |
| 4,753,915 | 6/1988 | Vogt et al. | 502/304 |
| 4,849,275 | 7/1989 | Hamaguchi et al. | 502/527 |
| 4,869,944 | 9/1989 | Harada et al. | 502/527 |
| 4,877,670 | 10/1989 | Hamanaka | 428/116 |
| 5,346,722 | 9/1994 | Beauseigneur et al. | 427/300 |
| 5,552,349 | 9/1996 | Ichii et al. | 501/9 |
| 5,607,885 | 3/1997 | Ichii et al. | 501/9 |
| 5,629,067 | 5/1997 | Kotani et al. | 428/116 |

FOREIGN PATENT DOCUMENTS

| | | | |
|---|---|---|---|
| 62-4441 | 1/1987 | Japan | B01J 23/02 |
| 62-8210 | 2/1987 | Japan | B01J 37/02 |

OTHER PUBLICATIONS

Patent Abstracts of Japan, vol. 010, No. 280 (C–374), Sep. 24, 1986 & JP 61 101248 A (Matsushita Electric Ind Co Ltd), May 20, 1986, *abstract*.

Patent Abstracts of Japan, vol. 013, No. 199 (C–594), May 11, 1989 & JP 01 022348 A (Nissan Motor Co Ltd), Jan. 25, 1989, *abstract*.

*Primary Examiner*—Mark L. Bell
*Assistant Examiner*—Patricia L. Hailey
*Attorney, Agent, or Firm*—Parkhurst & Wendel

[57] ABSTRACT

A ceramic honeycomb catalyst having an excellent thermal shock resistance in which a carrier is coated on a ceramic honeycomb structural body, has a mean thermal expansion coefficient in a range from 40° to 800° C. of smaller than $0.7 \times 10^{-6}$/°C. Therefore, it is possible to obtain a ceramic honeycomb catalyst having excellent thermal shock resistance in which a mechanical strength of a ceramic honeycomb structural body to which a carrier such as γ-alumina is coated is not decreased and the carrier is not peeled off from the ceramic honeycomb structural body.

6 Claims, 6 Drawing Sheets

Present invention 7
(heat treatment at 900°C)

FIG_5
Present invention 7
(heat treatment at 900°C)
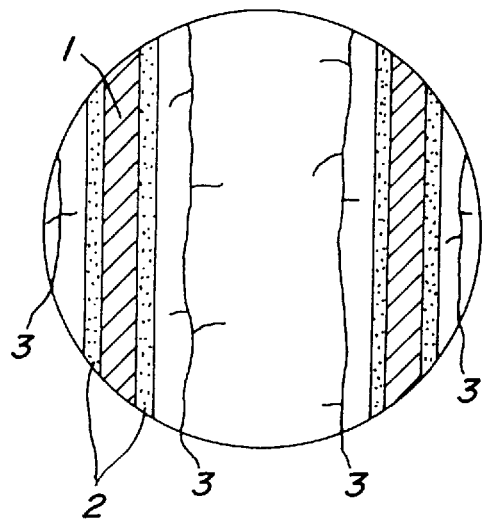
FIG_6
Present invention 9
(heat treatment at 1100°C)
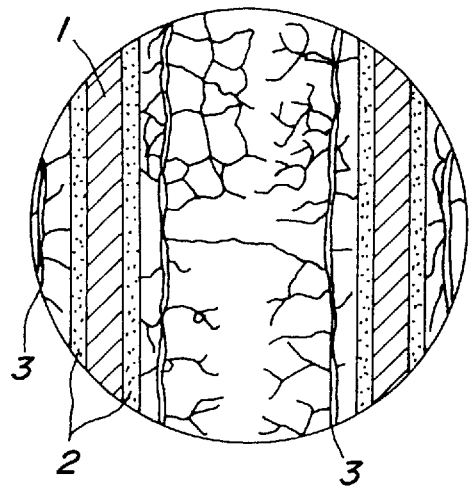

FIG_7
Present invention 12
(heat treatment at 900°C)
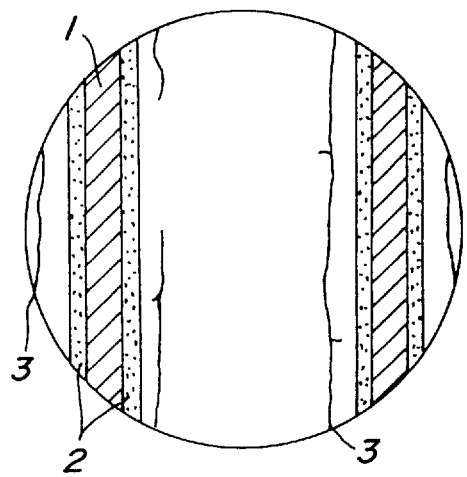
FIG_8
Present invention 14
(heat treatment at 1100°C)
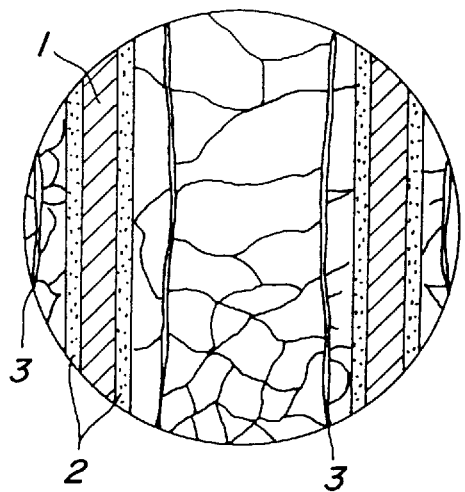

CERAMIC HONEYCOMB CATALYST HAVING EXCELLENT THERMAL SHOCK RESISTANCE

BACKGROUND OF THE INVENTION

(1) Field of the Invention

The present invention relates to a ceramic honeycomb catalyst which is used for purifying an exhaust gas of internal combustion engine and for trapping particles and also used for purifying and/or deodorizing a fired gas which uses various gases or petroleum as a fuel.

(2) Related Art Statement

In a ceramic honeycomb catalyst which is actually used now, a carrier made of γ-alumina as a main ingredient to which precious metals are supported is supported on a ceramic honeycomb structural body made of cordierite for a purpose of increasing a specific surface. In this case, the reason for using cordierite as the ceramic honeycomb structural body is that it shows a least thermal expansion coefficient among various ceramics, and thus it is not fractured i.e. it has a thermal shock resistance with respect to a rapid temperature variation due to an introduction of a high temperature exhaust gas from engines or the like.

However, since a thermal expansion coefficient of γ-alumina is two times or more larger than that of cordierite ceramic honeycomb structural body, it is necessary to coat a carrier by heat on a ceramic honeycomb structural body so as not to peel off during use on automobiles. Therefore, a thermal expansion coefficient of the coated ceramic honeycomb structural body to which a carrier is coated is increased by 1.5 through 3 times as that of the ceramic honeycomb structural body to which no carried is coated, and thus there arises a problem such that a thermal shock resistance of the catalyst is decreased as compared with the honeycomb structural body which consists the catalyst. To solve this problem, various techniques mentioned below were proposed.

In Japanese Patent Laid-Open Publication No. 62-4441, there discloses a technique such that a specific surface of the ceramic honeycomb structural body is increased by performing an acid treatment and a heat treatment without coating a carrier so as to decrease a thermal expansion coefficient of the catalyst. Moreover, in Japanese Patent Publication No. 62-8210, there discloses a technique such that an increase of a thermal expansion coefficient of the catalyst is prevented in such a manner that no carrier is inserted into micro cracks having a width of about 0.5 μm generated in the honeycomb structural body by first coating methyl cellulose or the like on the honeycomb structural body and then supporting a carrier thereon by performing a heat treatment so as to remove the coated methyl cellulose. Further, also in Japanese Patent Laid-Open Publication No. 7-10650, there discloses a technique such that no carrier is inserted into micro cracks having a width of about 0.5 μm by pre-coating various kinds of chemical compounds on the honeycomb structural body and then removing it by performing a heat treatment.

In the known techniques mentioned above, a problem of the technique in which the honeycomb structural body is subjected to an acid treatment as shown in Japanese Patent Laid-Open Publication No. 62-4441 is a decrease of mechanical strength as mentioned in detail in this Publication. Recently, using conditions required for the automobile catalyst becomes severe more and more. Therefore, the catalyst is designed to be supported only by a side surface in a converter from the view point of a catalyst using efficiency so as to flow an exhaust gas through overall cross section of the catalyst, while in the conventional converter the catalyst is supported not only by a side surface but also by an outer peripheral portion of an end surface thereof even if there is a portion through which no exhaust gas if flowed. Moreover, a thickness of cell wall of the ceramic honeycomb structural body is designed to be thinner to about 100 μm which is two third of that of the conventional one having a wall thickness of about 150 μm. Therefore, an acid treatment shown in Japanese Patent Laid-Open Publication No. 62-4441 is not used because a mechanical strength of the acid treated honeycomb structural body is one half of that of the normal honeycomb structural body under some circumstances.

Further, in the technique shown in Japanese Patent Laid-Open Publication No. 62-4441, no γ-alumina is coated on the ceramic honeycomb structural body, and thus a purifying performance is low even if the ceramic honeycomb structural body according to this technique has a large specific surface. This is because a large specific surface of this technique is achieved in such a manner that MgO is selectively dissolved from the cell wall by an acid treatment and small pores are generated in a deep portion of the cell wall, and thus an exhaust gas does not easily contact the precious metal supported on the small pores as compared with γ-alumina.

Moreover, in the techniques shown in Japanese Patent Publication No. 62-8210 and Japanese Patent Laid-Open Publication No. 7-10650, since the carrier is not inserted into micro cracks and small pores, a thermal expansion coefficient of the ceramic honeycomb structural body to which the carrier is coated is not increased. However, a so-called anchor-effect due to an insertion of carrier into micro cracks or small pores is not achieved, and thus a connection strength between the ceramic honeycomb structural body and the carrier is decreased. Therefore, the carrier is liable to be peeled off under a hard vibration of automobiles. Moreover, a cost is increased due to an increase of producing steps.

SUMMARY OF THE INVENTION

An object of the invention is to eliminate the drawbacks mentioned above and to provide a ceramic honeycomb catalyst having excellent thermal shock resistance in which a mechanical strength of a ceramic honeycomb structural body to which a carrier such as γ-alumina is coated is not decreased and the carrier is not peeled off from the ceramic honeycomb structural body.

According to the invention, a ceramic honeycomb catalyst having excellent thermal shock resistance in which a carrier is coated on a ceramic honeycomb structural body, comprises a mean thermal expansion coefficient in a range from 40° C. to 800° C. of smaller than $0.7 \times 10^{-6}/°C$.

In this invention, a ceramic honeycomb catalyst having excellent thermal shock resistance in which a mechanical strength of the catalyst is not decreased and a carrier is not peeled off can be obtained by selecting a thermal expansion coefficient of the carrier which is coated on the ceramic honeycomb structural body and making minimum an increase of thermal expansion coefficient of the catalyst in which the carrier such as γ-alumina is coated on the ceramic honeycomb structural body.

BRIEF DESCRIPTION OF THE DRAWINGS

FIG. 5 is a schematic view illustrating an outer appearance of a present invention 7;

FIG. 6 is a schematic view depicting an outer appearance of a present invention 9;

FIG. 7 is a schematic view showing an outer appearance of a present invention 12; and FIG. 8 is a schematic view illustrating an outer appearance of a present invention 14.

DESCRIPTION OF THE PREFERRED EMBODIMENTS

Figure 1:
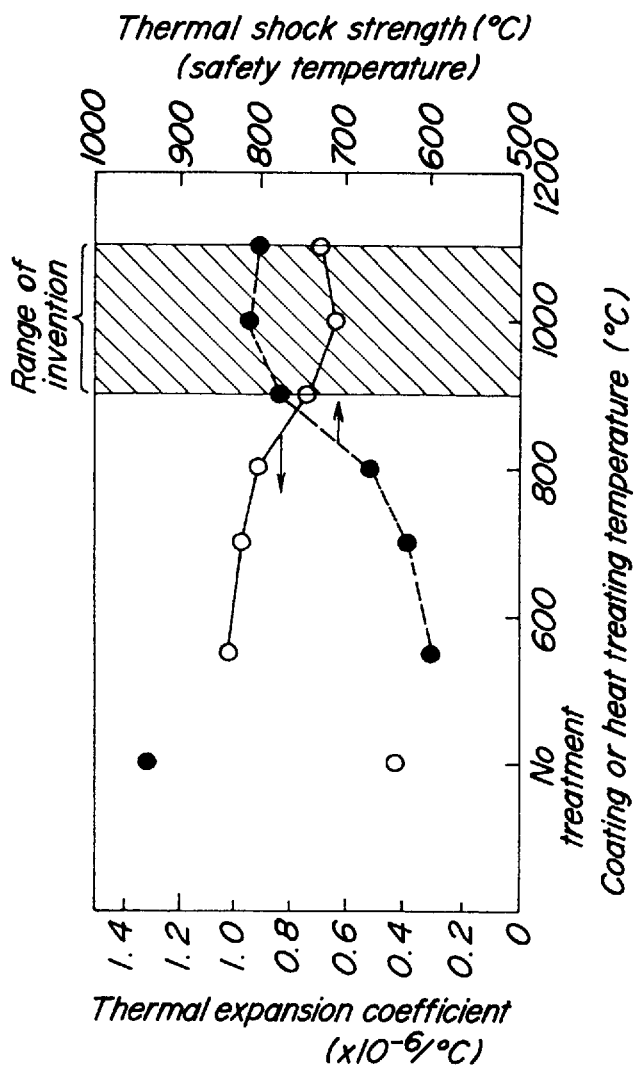
FIG. 1 is a graph showing a relation between a heat treatment temperature and a thermal expansion coefficient or a thermal shock strength in an embodiment 1.

In Japanese Patent Publication No. 62-8210 and Japanese Patent Laid-Open Publication No. 7-10650, there discloses a reason of an increase of thermal expansion coefficient of a catalyst while a thermal expansion coefficient of a carrier itself is not increased since micro cracks absorb a thermal expansion as follows. That is to say, since the carrier having a relatively high thermal expansion coefficient is inserted into micro cracks or small pores of a ceramic honeycomb structural body and is expanded under a high temperature in the ceramic honeycomb structural body due to a wedge effect, cracks are generated and extended in the ceramic honeycomb structural body and thus a thermal expansion coefficient of the catalyst is increased.

However, a number of micro cracks and small pores are generated in the honeycomb structural body in an adjacent manner. Therefore, if the carrier having a large thermal expansion coefficient is expanded in the micro cracks or the small pores, such an expansion is absorbed with each other except a most peripheral one. Actually, such an expansion is not completely absorbed since the micro cracks and the small pores have a different dimension. This is similar to a railway in such a manner that, if the carrier is inserted into the micro cracks and the small pores, a rail of the railway becomes jointless and thus the overall length of the rail contributing to a thermal expansion coefficient becomes longer.

On the other hand, a portion of the catalyst fractured by an actual thermal shock test is a substantially center portion thereof, and at the center portion cracks are generated radially so that the catalyst is cut into round slices. If such a fracture is due to the wedge effect mentioned above, a fractured portion is not determined typically. However, substantially all the catalysts are fractured at a center portion actually, and thus it is understood that the catalyst is fractured due to a tensile strength instead of the wedge effect.

Under such a circumstance, the inventors cut out a specimen having a length of 10 mm and section of 1 cell square from the catalyst prepared by coating the carrier at 550° C. on the ceramic honeycomb structural body having a thermal expansion coefficient of $0.4 \times 10^{-6}$/°C., and then peeled off the carrier from the specimen. Then, a thermal expansion coefficient of the thus prepared specimen was measured. As a result, a thermal expansion coefficient of the thus prepared specimen on which no carrier is coated is reduced to $0.65 \times 10^{-6}$/°C., while that of the specimen on which the carrier is coated is $1.2 \times 10^{-6}$/°C. That is to say, it is understood that a tensile effect due to the carrier coated on the ceramic honeycomb structural body is largely effected on a thermal expansion coefficient as compared with the wedge effect mentioned above.

Therefore, it is understood that a reason of a decrease of thermal expansion coefficient disclosed in Japanese Patent Publication No. 62-8210 and Japanese Patent Laid-Open Publication No. 7-10650 is as follows. That is to say, a connection strength between the ceramic honeycomb structural body and the carrier is weakened since the carrier is not inserted into the micro cracks or the small pores, and thus a thermal expansion of the carrier is not easily conducted to the ceramic honeycomb structural body.

The carrier is coated on a cell inner surface of the ceramic honeycomb structural body in such a manner that the ceramic honeycomb structural body is immersed into an aqueous solution, in which γ-alumina ($Al_2O_3$), ceria ($CeO_2$) having a function of absorbing oxygen, lanthanum ($La_2O_3$) for improving a heat resistance performance, zirconia ($ZrO_2$) or the like are mixed, or that a slurry having the same chemical composition as that of the above aqueous solution is introduced into the ceramic honeycomb structural body. After that, the thus coated carrier is dried and then subjected to a heat treatment at about 600° C. so as not to peel off.

In the present invention, in order to decrease a thermal expansion coefficient of the ceramic honeycomb catalyst comprising the ceramic honeycomb structural body and the carrier coated on a surface of the ceramic honeycomb structural body, two features of γ-alumina i.e. (1) thermal expansion coefficient being larger than that of the honeycomb structural body and (2) a volume shrink being generated on a high temperature are utilized.

That is to say, if the carrier coated on the ceramic honeycomb structural body is subjected to a heat treatment at a high temperature, a volume shrinkage occurs, and the generated shrinkage functions as a compressive stress with respect to the ceramic honeycomb structural body. Moreover, since the carrier having a large thermal expansion coefficient is liable to be shrunk largely during a cooling state, a larger compressive stress is applied to the ceramic honeycomb structural body in this cooling state. Under such a condition, if heat is applied to the catalyst, the ceramic honeycomb structural body and the carrier are extended, but a tensile stress is not applied to the ceramic honeycomb structural body till a temperature at which a compression stress of the ceramic honeycomb structural body is zero. Therefore, the catalyst to which a heat treatment is applied does not reach to a tensile fracture stress until a temperature larger than that of the catalyst to which no heat treatment is applied, and thus the catalyst to which a heat treatment is applied is not fractured till a high temperature.

If a heat treatment is performed at a higher temperature, the carrier does not endure its large expansion and shrinkage, and thus cracks are generated in the carrier. At about 900° C., cracks are at first generated in an axial direction (cell direction) at a corner portion to which a thick carrier is coated. Then, a width of cracks is widened corresponding to an increase of temperature, and further generated and propagated in a perpendicular direction with respect to that of the first generated crack, so that the cracks constructs a network. In this case, if a temperature becomes higher and higher, a width of cracks becomes larger and thus the crack network becomes smaller. Under such a condition, if a heat is applied to the catalyst, an expansion of the carrier can be absorbed by the cracks, and thus a thermal expansion coefficient of the ceramic honeycomb catalyst becomes smaller.

Therefore, in order to make the carrier of the catalyst into a number of small pieces for the purpose of decreasing a thermal expansion coefficient of the catalyst, it is understood that a heat treatment is performed at a higher temperature. On the other hand, if a heat treatment is performed at a higher temperature, a volume shrinkage of γ-alumina causes a decrease of specific surface, and thus a purifying performance of the catalyst which is a basic purpose of the catalyst is decreased. Therefore, it is not preferred to perform a heat treatment at an excessively higher temperature.

Hereinafter, an actual embodiment will be explained.

Embodiment 1

Cordierite honeycomb structural bodies were immersed into and pulled up from a slurry in which an aluminum nitrate solution is added in active alumina and ceria powders on a market. Then, residual slurry was wiped out from the cordierite honeycomb structural bodies, and a drying for 2 hours at 150° C. was repeated at 3 times for the cordierite honeycomb structural body having a web thickness of 0.11 mm and at 2 times for the cordierite honeycomb structural body having a web thickness of 0.17 mm. After that, a heat treatment was performed for 2 hours at a temperature shown in the following Table 1 to obtain ceramic honeycomb catalysts. In this case, an amount of carrier coated on the cordierite honeycomb structural body was 240 g per little of volume of honeycomb structural body.

Then, a heat treatment was performed in an electric furnace at a temperature shown in Table 1 with respect to the thus obtained ceramic honeycomb catalysts to obtain the ceramic honeycomb catalysts according to comparative example Nos. 1–3 and present invention Nos. 1–3. The number of specimens was five per respective temperatures. After that, samples were cut out from respective specimens at central and peripheral of end surface portions, central and peripheral of center of axial portion. Then, a thermal expansion coefficient in a range of 40°–800° C. of the end surfaces were measured, and the other four samples were used for a thermal shock test in an electric furnace. The thermal shock test was performed in the following manner. At first, the samples were set in the electric furnace maintained at 600° C. for 1 hour, and were put out from the electric furnace into a room. Then, an appearance of the samples was observed until the samples were completely cooled. At the same time, an overall surface of the samples was lightly rung by a thin metal stick. Then, if no cracks were observed and a ringing sound was a clear metal sound, the samples were assumed to pass such a temperature. If the samples passed, a temperature of the electric furnace was increased by 25° C., and the same observation and ringing was repeated until a crack was observed or the ringing sound became a dull sound. Then, a thermal shock strength was shown by a highest passed temperature. Respective mean values of the measured data were shown in the following Table 1.

TABLE 1

| Embodiment | Items | Heat treatment temperature (°C.) | Cell structure, web thickness (mm)/ cell density (piece/m$^2$) | Size of honeycomb structural body (mm) | Thermal expansion coefficient ($\times 10^{-6}$/°C.) | Thermal shock strength (°C.) |
|---|---|---|---|---|---|---|
| Body (base) | | — | 0.17/620 K | φ101.6 × 1524L | 0.42 | 937 |
| Catalyst 1 | Comparative Example 1 | 550 | 0.17/620 K | | 1.02 | 600 |
| | Comparative Example 2 | 700 | 0.17/620 K | | 0.97 | 625 |
| | Comparative Example 3 | 800 | 0.17/620 K | | 0.91 | 650 |
| | Present Invention 1 | 900 | 0.17/620 K | | 0.73 | 775 |
| | Present Invention 2 | 1000 | 0.17/620 K | | 0.63 | 813 |
| | Present Invention 3 | 1100 | 0.17/620 K | | 0.68 | 800 |

From the results shown in Table 1, it is understood that the present inventions 1–3 in which the heat treatment is performed at 900°–1000° C. shows a decrease of the mean thermal expansion coefficient to lower than 0.7×10$^{-6}$/°C. and an increase of the thermal shock strength. Therefore, an effect of the present invention can be confirmed. Moreover, from the result of this embodiment 1, a relation between the heat treatment temperature and the thermal expansion coefficient or the thermal shock strength is shown in FIG. 1.

Embodiment 2

The specimen according to the comparative example 1 in the embodiment 1 was set on a test engine, and a driving condition of the test engine was controlled in such a manner that a temperature of a center axial portion of the specimen i.e. the catalyst became a predetermined level. In this manner, with respect to three specimens, a heat treatment in the test engine was performed at a temperature shown in the following Table 2 for 5 minutes. In this case, a temperature increasing rate was controlled linearly at 500° C./minute. This is because, if a temperature of the catalyst is abruptly increased by a full throttle, the catalyst is fractured by a thermal shock as mentioned below. The used test engine was V-type 4400 cc engine, and the heat treatment of the catalyst was performed under such a condition that the catalysts were set at both ends of the test engine. After that, in the same manner as the embodiment 1, one specimen was used for measuring a mean thermal expansion coefficient in a range of 40°–800° C., and the other two specimens were used for the thermal shock test. Respective mean values of the measured data were shown in the following Table 2.

TABLE 2

| Embodiment | Items | Heat treatment temperature (°C.) | Cell structure, web thickness (mm)/ cell density (piece/m$^2$) | Size of honeycomb structural body (mm) | Thermal expansion coefficient (×10$^{-6}$/°C.) | Thermal shock strength (°C.) |
|---|---|---|---|---|---|---|
| Catalyst 2 | Comparative Example 4 | 800 | 0.17/620 K | φ101.6 × 152.4L | 0.89 | 675 |
| | Present Invention 4 | 900 | 0.17/620 K | | 0.70 | 750 |
| | Present Invention 5 | 1000 | 0.17/620 K | | 0.61 | 800 |
| | Present Invention 6 | 1100 | 0.17/620 K | | 0.64 | 788 |

Figure 2:
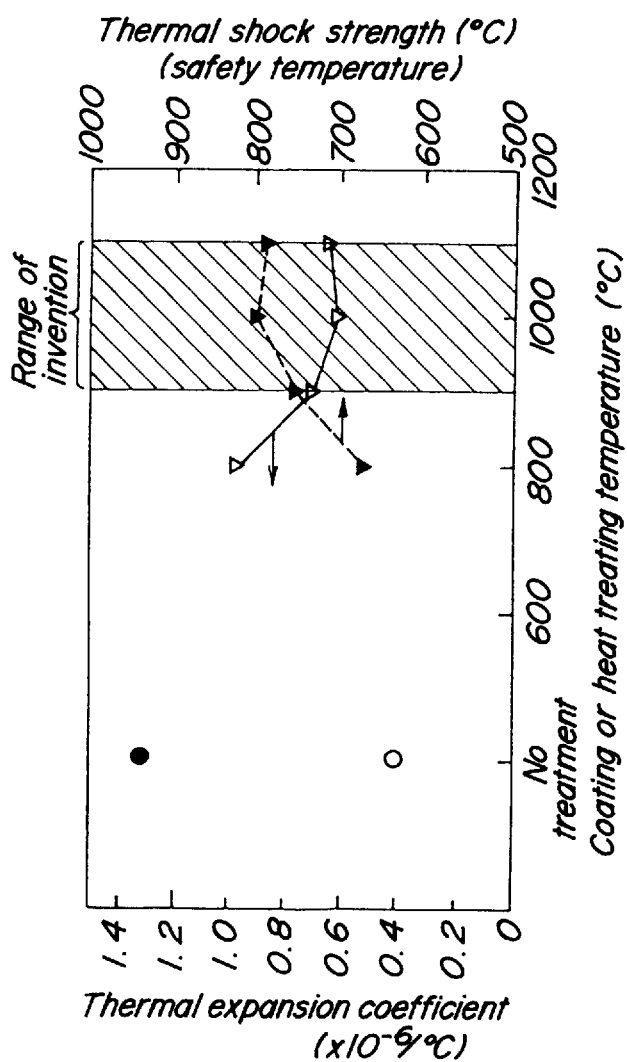
FIG. 2 is a graph illustrating a relation between a heat treatment temperature and a thermal expansion coefficient or a thermal shock strength in an embodiment 2.

From the result shown in Table 2, it is understood that the present invention is effective even if the heat treatment is performed by an exhaust gas from an automobile engine. Moreover, from the result of this embodiment 2, a relation between the heat treatment temperature and the thermal expansion coefficient or the thermal shock strength is shown in FIG. 2.

Further, a sample prepared by cutting the specimen according to the comparative example 1 in such a manner that a length was 102 mm was set just below a manifold of 4-cycle 2000 cc engine. Then, the engine was full throttled under a driving condition such that a temperature of the center axial portion of the catalyst became 1000° C. As a result, in the sample according to the comparative example 1 in which the heat treatment was performed at 550° C., cracks were generated circumferentially at the center axial portion. On the other hand, if the same test was performed with respect to a sample prepared by cutting the specimen according to the present invention 5, in which the heat treatment was performed at 1000° C., in such a manner that a length was 102 mm, the sample prepared from the present invention 5 was not fractured.

Embodiments 3–5

As the embodiment 3, a converter on the market was purchased, and a catalyst in the converter was detached from the converter. One catalyst was cut in such a manner that a length became 25 mm to obtain a specimen. Respective one catalyst was maintained as it was. Then, the catalysts and the specimens according to a comparative example 6 and present inventions 7–9 other than a comparative example 5 were subjected to a heat treatment in an electric furnace at a temperature shown in the following Table 3 as is the same as the embodiment 1. Moreover, the catalyst according to the comparative example 5 was not subjected to the heat treatment. After that, samples were cut out form the specimen having a length of 25 mm at center portion and peripheral portion, and a thermal expansion coefficient of the sample was measured in the same manner as that of the embodiment 1. Moreover, with respect to the catalyst, a thermal shock strength test was performed in the same manner as that of the embodiment 1. Mean thermal expansion coefficients of the measured data and thermal shock strengths of the measured data were shown in the following Table 3.

As the embodiment 4, the catalysts obtained from the converter on the market were used in the same manner as that of the embodiment 3. However, only thermal expansion coefficient was measured, and the thermal shock strength was not measured. The results were also shown in Table 3.

As the embodiment 5, the catalysts obtained from the converter on the market were used, and a thermal expansion coefficient thereof was measured in the same manner as that of the embodiment 1. As a thermal shock strength, the thermal shock test was performed as follows. At first, the catalyst was sealed in a chamber having a cone. It was assumed that one test cycle was determined in such a manner that a high temperature gas obtained by firing a propane gas was flowed for 5 minutes and then an air having a room temperature was flowed for 5 minutes. Then, the catalyst was put out from the chamber after ten test cycles were performed in the chamber. After that, an appearance of the catalyst was observed by naked eyes, and an overall surface of the catalyst was lightly rung by a thin metal stick. Then, if no cracks were observed and a ringing sound was a clear metal sound, the catalysts were assumed to pass such a temperature. If the catalyst passed a temperature of the electric furnace was increased by 25° C., and the same observation and ringing was repeated till a crack was observed or the ringing sound became a dull sound. Then, a thermal shock strength was shown by a highest passed temperature. Respective mean values of the measured data were shown in the following Table 3.

TABLE 3

| Embodiment | Items | Heat treatment temperature (°C.) | Cell structure, web thickness (mm)/ cell density (piece/m$^2$) | Size of honeycomb structural body (mm) | Thermal expansion coefficient (×10$^{-6}$/°C.) | Thermal shock strength (°C.) |
|---|---|---|---|---|---|---|
| Catalyst 3 | Comparative example 5 | — | 0.30/465 K | φ106 × 114L(25L) | 0.99 | 650 |
| | Comparative example 6 | 800 | 0.30/465 K | | 0.95 | 650 |
| | Present Invention 7 | 900 | 0.30/465 K | | 0.68 | 775 |
| | Present Invention 8 | 1000 | 0.30/465 K | | 0.63 | 800 |
| | Present Invention 9 | 1100 | 0.30/465 K | | 0.67 | 750 |
| Catalyst 4 | Comparative | — | 0.11/620 K | φ103 × (25L) | 0.99 | — |

TABLE 3-continued

| Embodiment | Items | Heat treatment temperature (°C.) | Cell structure, web thickness (mm)/ cell density (piece/m²) | Size of honeycomb structural body (mm) | Thermal expansion coefficient (×10⁻⁶/°C.) | Thermal shock strength (°C.) |
|---|---|---|---|---|---|---|
| | example 7 | | | | | |
| | Present Invention 10 | 900 | 0.11/620 K | | 0.64 | — |
| | Present Invention 11 | 1000 | 0.11/620 K | | 0.59 | — |
| Catalyst 5 | Comparative example 8 | — | 0.17/620 K | φ103 × 130L(25L) | 0.86 | 700 |
| | Comparative example 9 | 800 | 0.17/620 K | | 0.68 | 800 |
| | Present Invention 12 | 900 | 0.17/620 K | | 0.56 | 960 |
| | Present Invention 13 | 1000 | 0.17/620 K | | 0.45 | 1010 |
| | Present Invention 14 | 1100 | 0.17/620 K | | 0.55 | 960 |

Figure 3:
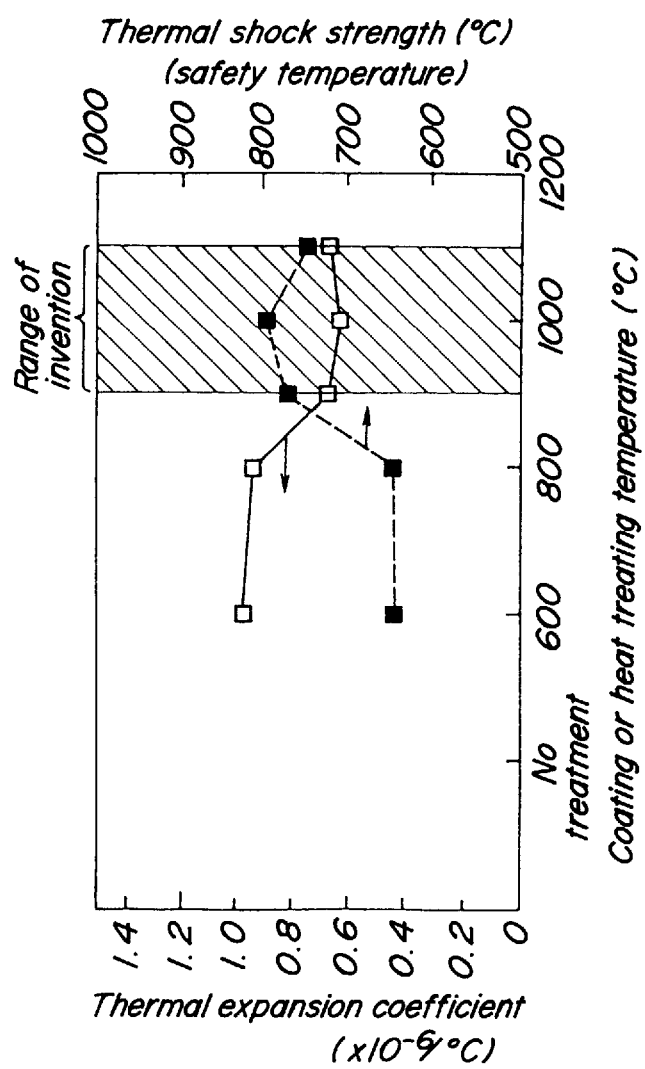
FIG. 3 is a graph depicting a relation between a heat treatment temperature and a thermal expansion coefficient or a thermal shock strength in an embodiment 3.
Figure 4:
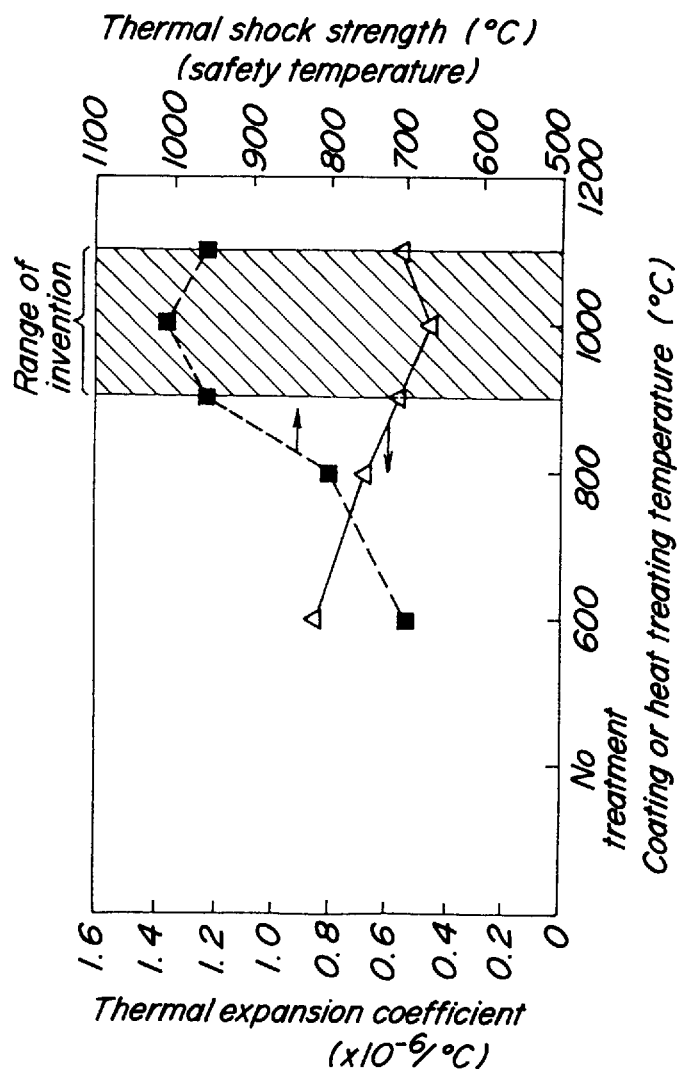
FIG. 4 is a graph showing a relation between a heat treatment temperature and a thermal expansion coefficient or a thermal shock strength in an embodiment 4.

From the result shown in Table 3, it is understood that the present invention is effective even or the catalyst adapted in the automobile on the market. Moreover, from the results of these embodiments 3 and 5, relations between the heat treatment temperature and the thermal expansion coefficient or the thermal shock strength are respectively shown in FIGS. 3 and 4.

Moreover, FIGS. 5–8 are schematic views respectively showing an outer appearance of a part of the present invention 7 in the embodiment 3, the present invention 9 in the embodiment 3, the present invention 12 in the embodiment 5, and the present invention 14 in the embodiment 5. In FIGS. 5–8, 1 is a honeycomb structural body (cross section), 2 is a carrier (cross section) and 3 is cracks in the carrier. From the results shown in FIGS. 5–8, it is understood that a surface of the carrier of the present invention is fractured by the crack 3.

In the embodiment mentioned above, the electric furnace and the exhaust gas of the automobile were used for performing the heat treatment, but means for performing the heat treatment is not limited to them. However, in the case of performing the heat treatment in the electric furnace in an air, if the heat treatment is performed after a precious metal is coated, finely dispersed precious metals are sintered to form particles, and a specific surface of the precious metal is decreased, so that a purifying performance is also decreased. Therefore, it is preferred to perform the heat treatment before the precious metal is coated.

Moreover, in the embodiment using the electric furnace mentioned above, a large treatment time is required, since an agitation device is not used in the electric furnace and a heat transmission is conducted only through a wall of the catalyst. However, this treatment time is not limited to the embodiment mentioned above, and is freely designed according to a property of the carrier between the heat treatment and the thermal expansion. This is the same in the case of using the engine exhaust gas for performing the heat treatment.

The present invention is not limited to the embodiments mentioned above, but various modifications are possible. For example, in the embodiments mentioned above, a cross sectional shape in a radial direction of the ceramic honeycomb structural body is circular, but it is not limited to a circular shape. In this case, the present invention is effective even if it is ellipse. Moreover, a cell shape is not limited to a square as shown in the embodiment mentioned above. Further, in the embodiment mentioned above, use is made of cordierite as the ceramic honeycomb structural body, but it is not also limited.

As mentioned above, according to the invention, a ceramic honeycomb catalyst having excellent thermal shock resistance in which a mechanical strength of the catalyst is not decreased and a carrier is not peeled off can be obtained by selecting a thermal expansion coefficient of the carrier which is coated on the ceramic honeycomb structural body and making minimum an increase of thermal expansion coefficient of the catalyst in which the carrier such as γ-alumina is coated on the ceramic honeycomb structural body.

What is claimed is:

1. A ceramic honeycomb catalyst having excellent thermal shock resistance, comprising: a carrier-coated ceramic honeycomb structural body subjected to a heat treatment at a temperature of 900°–1100° C., wherein a mean thermal expansion coefficient of the combined ceramic honeycomb structural body and carrier is smaller than $0.7 \times 10^{-6}$/°C. in a range from 40° to 800° C.

2. The ceramic honeycomb catalyst according to claim 1, wherein an extent of said mean thermal expansion coefficient before and after said carrier is coated on said ceramic honeycomb structural body is smaller than $0.3 \times 10^{-6}$/°C.

3. The ceramic honeycomb catalyst according to claim 1, wherein said carrier is coated on a ceramic honeycomb structural body having a mean thermal expansion coefficient in a range from 40° to 800° C. of smaller than $0.4 \times 10^{-6}$/°C.

4. The ceramic honeycomb catalyst according to claim 1, wherein said heat treatment is performed in an electric furnace.

5. The ceramic honeycomb catalyst according to claim 1, wherein said heat treatment is performed by heat of an exhaust gas.

6. The ceramic honeycomb catalyst according to claim 1, wherein said carrier includes a crack after said carrier is coated on said ceramic honeycomb structural body and said heat treatment is performed.

* * * * *